Jan. 18, 1938.  W. T. BIRCH  2,105,876
WATER PRESSURE REGULATOR
Original Filed March 4, 1935
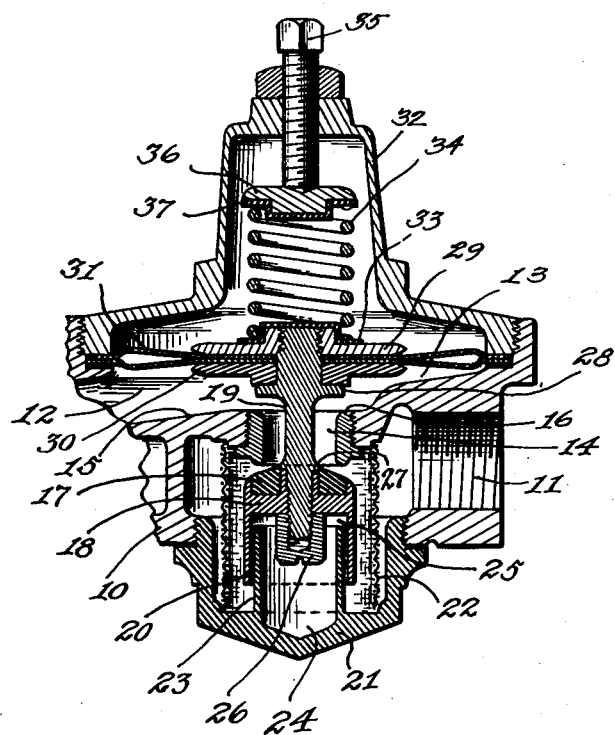
Inventor
*William T. Birch*
By *Charhew Hills*
Attorney Patented Jan. 18, 1938

2,105,876

UNITED STATES PATENT OFFICE 2,105,876

WATER PRESSURE REGULATOR

William Thomas Birch, Chicago, Ill.

Original application March 4, 1935, Serial No. 9,313. Divided and this application November 30, 1936, Serial No. 113,496

1 Claim. (Cl. 50—23)

The present invention relates to fluid pressure regulators, such as are used in connection with closed hot water heating systems having relief valve protection. The relief valve permits hot water to escape from the heating system whenever the pressure of the system rises above what is considered a safe value, and the rise in pressure is due to the expansion of the water when heated. After the water in the system cools so that the pressure of the system falls, the regulator functions to supply the system with an amount of water equal to that lost by the opening of the relief valve.

The hot water heating system usually becomes relatively cool during the night, and should the pressure regulator close, open and close suddenly then the resulting water hammer and water surging in the piping connected to the regulator is very annoying to those who have retired for the night, and may occasion shock in those who are awakened suddenly. Water hammer is also very annoying in hospitals, churches and auditoriums.

It is an important object of the present invention to provide a water pressure regulator for hot water heating systems adapted to open and close without causing surging or water hammer in the connected system.

It is also an important object of the present invention to provide a water regulator having novel dash pot means provided with means to ensure an air seal and a water seal between a pair of relatively movable parts.

Other and further objects of the present invention will appear hereinafter.

The present application is a division of application, Serial No. 9,313, filed March 4, 1935, and resulting in Patent No. 2,067,229 of January 12, 1937.

In the accompanying drawing,

The figure is a central vertical longitudinal section through the regulator, with parts in plan and with parts broken.

The regulator comprises a casing 10 which is provided at one end with a water inlet 11, into which a service pipe is connected in use, and with means defining an outlet 12 at the other end, for connection with the relief valve of a hot water heating system.

The inlet 11 communicates with a low pressure chamber 13 through a vertical port 14 in a web 15 between the chamber and the inlet. In this port a valve seat member 16 is threaded so as to be removable from below and to normally present a downwardly directed valve seat for engagement by a regulating valve 17.

The valve 17 is inserted in a recess formed in a valve-carrying member 18, which is threaded on a valve stem 19, and the member 18 is provided with a downwardly extending annular wall portion 20.

In vertical alignment with the port 14, the base of the casing 10 has an opening normally closed by a screw cap 21 adapted to support a cylindrical screen 22 which extends between the web 15 and the cap.

The annular wall 20 encircles an upstanding annular wall portion 23 formed on the screw cap 21 to provide a dash pot for the valve assembly.

The wall 20 is fitted about the wall 23 so that it may move freely, but the clearance between the walls is so small that water just oozes into the interior of the cup 24 defined by the wall 23 when the wall 20 rises.

In the drawing, the regulator valve is shown in its open position, and when the valve is in this position there is an air pocket 25 between the top of the wall 23 and the portion of the member 18 on which the valve 17 is seated. The pocket 25 remains filled with air, for it will be obvious that water in the cup 25 cannot do other than ooze over the upper edge of the wall 23, as the wall 20 descends.

The dash pot assembly, therefore, is an air dash pot with water seal, and with air sealing a portion of the assembly against water.

The valve-carrying member 18 is held in its assembled relation to the stem 19 by a nut 26 threaded on the lower end of the stem, and a portion of the upper face of the valve 17 engages a shoulder 27 formed on the stem to make a water tight connection therewith.

The wall 20 gives substantial protection to the wall 23 against the accumulating of whatever foreign matter may escape through the screen 22, and also guards against the passage of foreign matter into the cup 24.

The stem 19 extends vertically through the port 14, and near the upper end of the stem there is an enlargement 28 to provide a large bearing area, followed by a reduced portion on which a nut or washer 29 is threaded. Disposed opposite the washer 29 is a washer 30 seated on the enlarged portion of the stem, and between the washers 29 and 30 there is clamped a diaphragm 31, formed of a pair of dished members, and which are seated on the casing 10 and held in position by a hood 32 screwed into position to engage the marginal portion of the diaphragm.

A cap 33, of soft rubber, or the like, is fitted over the threaded washer 29 to provide a seat for the lower end of a coiled compression spring 34, housed in the hood 32.

An adjusting screw 35 is threaded through the head of the hood and bears against a pressure plate 36 provided with a lower portion reduced to enter the spring 34, and a cap 37, of soft rubber, or the like, is interposed between the plate and the spring.

The oppositely dished diaphragms cooperate with the spring 34 to operate the valve 17 with a snap action, that is, without fluttering of the valve as it moves to the closing position, and when the small differential in pressure between the inlet and the chamber 13, together with the usual constriction of the water stream as a valve closes, produces a condition encouraging hunting or fluttering of the valve about its closing position.

It will now be clear that the air pocket 25 in the dash pot assembly is particularly beneficial in ensuring smooth operation of the snap acting valve, and lengthens the life of the valve 17 and the seat 16.

I am aware that many changes may be made and numerous details of construction may be varied through a wide range without departing from the principles of this invention, and I, therefore, do not purpose limiting the patent granted hereon otherwise than is necessitated by the prior art.

What is claimed is:

A water pressure regulator comprising a casing having an inlet and an outlet, means in said casing dividing said casing into an inlet chamber and an outlet chamber and carrying a ported valve seat, a valve movable in said inlet chamber and engageable with said seat, means in said casing connected to said valve to move said valve to open and to closed positions, respectively, with a snap action, a first cup-shaped member movable with said valve and having an outwardly extending imperforate annular wall, a second cup-shaped member secured stationary on said casing and having an outwardly extending imperforate annular wall disposed in nested relation with a wall of said first cup, the lip of one cup being in spaced-apart relation to the opposed bottom of the other cup to provide an air chamber when said valve is in open position, the opposed walls of said cup members being spaced to permit free relative movement of the cups and provide a narrow passage therebetween.

WILLIAM THOMAS BIRCH.